(12) United States Patent
Seo et al.

(10) Patent No.: US 11,060,776 B2
(45) Date of Patent: Jul. 13, 2021

(54) METHOD FOR CONTROLLING A REFRIGERATION DEVICE

(71) Applicant: Follett Corporation, Easton, PA (US)

(72) Inventors: Eric R. Seo, Bowmanstown, PA (US); Glenn Eric Bonney, Macungie, PA (US)

(73) Assignee: Follett Corporation, Easton, PA (US)

( * ) Notice: Subject to any disclaimer, the term of this patent is extended or adjusted under 35 U.S.C. 154(b) by 119 days.

(21) Appl. No.: 16/365,861

(22) Filed: Mar. 27, 2019

(65) Prior Publication Data

US 2020/0309432 A1 Oct. 1, 2020

(51) Int. Cl.
*F25B 49/02* (2006.01)

(52) U.S. Cl.
CPC ............ *F25B 49/02* (2013.01); *F25B 49/022* (2013.01); *F25B 49/025* (2013.01); *F25B 2500/19* (2013.01); *F25B 2600/0253* (2013.01); *F25B 2600/111* (2013.01); *F25B 2600/112* (2013.01); *F25B 2700/2117* (2013.01); *F25B 2700/21172* (2013.01)

(58) Field of Classification Search
CPC ...... F25B 49/02; F25B 49/022; F25B 49/025; F25B 2500/19; F25B 2600/0253; F25B 2600/111; F25B 2600/112; F25B 2700/2117; F25B 2700/21172
See application file for complete search history.

(56) References Cited

U.S. PATENT DOCUMENTS

| 4,152,902 | A | 5/1979 | Lush |
| 5,568,377 | A | 10/1996 | Seem et al. |
| 5,586,444 | A | 12/1996 | Fung |
| 5,711,159 | A * | 1/1998 | Whipple, III ......... F25D 17/065 62/186 |
| 6,216,478 | B1 | 4/2001 | Kang |
| 6,594,554 | B1 | 7/2003 | Seem et al. |
| 8,375,733 | B2 | 2/2013 | Preston et al. |
| 8,726,680 | B2 | 5/2014 | Schenk et al. |
| 9,328,956 | B2 | 5/2016 | Abbasi et al. |
| 9,683,563 | B2 | 6/2017 | Caillat |
| 9,920,968 | B2 | 3/2018 | Keen et al. |
| 2016/0061207 | A1 | 3/2016 | Penn, II et al. |
| 2017/0227273 | A1 | 8/2017 | West et al. |
| 2018/0001745 | A1 | 1/2018 | Vehr et al. |

FOREIGN PATENT DOCUMENTS

| CN | 104697109 A | 6/2015 |
| EP | 1318365 A1 | 11/2003 |

* cited by examiner

*Primary Examiner* — Elizabeth J Martin
(74) *Attorney, Agent, or Firm* — Paul & Paul (57) ABSTRACT

A method for controlling a refrigeration device including a variable speed compressor and variable speed evaporator and condenser fans includes modifying a PID control scheme by calculating a factor to reduce the restart speed of the compressor depending on the length of time the compressor was at rest, and modulating the point of oscillation of the control process.

3 Claims, 9 Drawing Sheets
(6 of 9 Drawing Sheet(s) Filed in Color)

METHOD FOR CONTROLLING A REFRIGERATION DEVICE

BACKGROUND OF THE INVENTION

1. Field of the Invention

The present invention relates to the control of refrigeration devices such as refrigerators and freezers.

2. Brief Description of the Prior Art

Modern refrigeration systems can employ components such as compressors and fans which can be controlled in response to environmental variables.

For example, a variable-speed or -capacity or -frequency or -displacement compressor can be employed in a refrigeration system to obtain a number of benefits. For example, such compressors can provide a more continuous operation that is proportional to the thermal load. Similarly, internal compressor starting stresses and wear can be reduced, thus improving compressor life. Further, average energy consumption can be reduced, and the acoustic noise generated by the compressor can be reduced.

Further, variable speed fans for exchanging heat with the refrigeration system condenser and evaporator can also be applied to enhance the overall system efficiency.

Generally, all refrigeration systems will benefit from employing variable speed compressors and variable speed fans.

However, high performance refrigerators and freezers that are employed in environments in which materials must be stored at closely-controlled temperatures, such as in scientific laboratories, pharmacies and hospitals, will benefit for the same reasons and with additionally improved temperature control.

Variable speed compressors are typically controlled to start at a given speed within a speed range defined by its manufacturer. At a full-load condition, such as during the initial cooldown of the refrigeration system, this could be the maximum speed of its range. At a partial-load restart condition, such as cycling off then on during steady state operation, this could be the minimum speed of its range.

Depending on the balance between the system refrigeration capacity and the thermal load, the system controller may need to stop the compressor (and optionally the condenser and/or evaporator fans too).

This may occur because the thermal load demand was met at less than the allowed minimum speed. As the thermal load increases during the subsequent off cycle the controller will then reach a point when it will restart the compressor.

Upon restart the input power surges, the acoustic noise increases and, depending on the control algorithm, the starting speed of the compressor and fans can be higher than necessary, a suboptimal over-response.

An over-response will provide excess refrigeration capacity which will too quickly satisfy the thermal load demand.

In response, the controller will stop the compressor, and the system will operate with an off/on cycle that may be too fast. Higher off/on cycling rates cause higher energy consumption and greater wear in the compressor, negating the principal benefits for having a variable speed compressor. Refrigeration systems can control the condenser fan with the compressor, both on/off and by speed with the fan speed relative to the compressor.

To prevent a quick off/on cycle of the compressor, an allowable off time is required. The allowable off time is another variable input to the control algorithm.

The allowable off time is a variable, not a fixed value, and it can be interrupted by sudden thermal load disturbances.

However, this allowable off time creates a different problem. Once either the allowable off time has expired, or once the main control feedback signal, such as a temperature, requires the compressor to restart, the feedback error can be undesirably large.

A P (proportional) or PI (proportional-integral) or PD (proportional-derivative) or PID (proportional-integral-derivative) control algorithm could cause a large restart speed over-response. When a basic P, PI, PD, or PID control algorithm is employed to control a refrigeration device, the P, I, and D coefficients must be "tuned." However, tuning these coefficients can be a long and difficult process, with concomitant high development costs.

Thus, there is a need for method of avoiding such over-responses.

SUMMARY OF THE INVENTION

The present invention provides an "Integrating Speed Response Damping Factor" (IDF) to prevent a compressor restart speed over-response. This IDF increasingly integrates during the time the compressor is off, and then proportionally dampens (i.e. attenuates) the output that was caused by the large feedback error. The IDF thus prevents an undesirable high restart speed. The IDF then decays after the compressor starts and remains operational until the IDF reaches zero. In the method of the present invention the IDF is applied to the compressor and condenser fan restart response, and optionally to the evaporator fan restart response.

The present invention also provides a method for tuning a P, PI, PD, or PID system by the use of an "Error Offset" (EO) value. A basic P, PI, PD, or PID control process drives a system's error to zero. This zero is the system's "Output Signal Point of Oscillation."

However, if the error value is modified from zero, then the Output Signal Point of Oscillation will be modified.

The present invention provides an Error Offset (EO) value which allows the range of a P coefficient to remain constant, and allows the point of oscillation to be moved to a desired point, thereby tuning the P, PI, PD, or PID system more quickly.

As noted, in a basic P, PI, PD, or PID control process the main control feedback error is always driven to zero.

However, at zero the control condition becomes a "point of oscillation" in which the output will try to remain, but this output may drift due to thermal load changes and/or disturbances.

To regulate this complex system multiple sensors and control feedback loops can be provided.

In order to achieve simplicity of the controller hardware and software, the present invention provides a method to modulate the point of oscillation.

The method of the present invention provides a second feedback loop to the P, PI, PD, or PID control system which combines a separate feedback error to the main control feedback error, namely, a "Continuous Calibration Factor" (CCF) that allows the manipulation of the basic P, PI, PD, or PID control process with basic arithmetic in which the system can automatically adjust the point of oscillation during operation in response to thermal load changes and/or disturbances. This Continuous Calibration Factor (CCF) is simpler than the P, PI, PD, or PID auto-tuning functions of the prior art.

In one aspect, the present invention provides a method of controlling a variable speed evaporator fan in a refrigeration device. In this aspect the refrigeration device includes an evaporator having an evaporator fan having a variable speed motor, a maximum duty cycle range percent, an evaporator coil, and an evaporator air inlet having a maximum temperature range and a median range temperature, as well as a condenser having a condenser fan, and a variable speed compressor. In this aspect, the method comprises first selecting a target internal air temperature (SP) for the refrigeration device, and measuring the temperature of the air at the evaporator air inlet (P1), and then calculating an evaporator fan error $(e(t)_E)$ by calculating the difference between the target internal air temperature (SP) and the temperature of the air at the evaporator air inlet (P1). Further, the method comprises selecting an evaporator fan proportional coefficient $(K_{PE})$, and calculating an evaporator fan proportional factor $(u(t)_E)$ by multiplying the evaporator fan error $(e(t)_E)$ by the evaporator fan proportional coefficient $(K_{PE})$. The method further comprises calculating an evaporator fan set factor (EFSF) by multiplying the evaporator fan proportional coefficient $(K_{PE})$ by the difference between the evaporator air inlet maximum temperature (MTRP1) and the evaporator air inlet median range temperature and adding the maximum evaporator duty cycle percent (MEDCP). The method further comprises subtracting the evaporator fan set factor (EFSF) from the evaporator fan proportional factor $(u(t)_E)$ to provide an evaporator fan output presignal (EFOPS), and then multiplying the evaporator fan output presignal (EFOPS) by −1 to provide a final evaporator fan output signal (FEFOS). The method then includes controlling the speed of the evaporator fan motor with the final evaporator fan output signal (FEFOS).

In a presently preferred embodiment of this aspect of the present invention, the method is employed with a variable speed compressor which periodically stops and starts run cycles. In this embodiment, the method further includes measuring the speed of the compressor motor. If the measured speed of the compressor motor is zero, then the method includes measuring the time elapsed since the immediate prior process iteration $(\Delta t_n)$, and providing a damping factor (DF), and a damping total factor $(DT(t_{n-1}))$ from the immediate prior process iteration. The method then also includes calculating a current damping total factor $(DT(t_n))$ by multiplying the time elapsed since the immediate prior process iteration $(\Delta t_n)$ by the damping factor (DF) and adding the damping total factor $(DT(t_{n-1}))$ from the immediate prior process iteration. However, if the measured speed of the compressor motor is not zero, then the method includes measuring the time elapsed since the immediate prior process iteration $(\Delta_n)$, providing a damping factor (DF), a damping total factor $(DT(t_{n-1}))$ from the immediate prior process iteration, and a decay factor (DKF). The method then includes calculating a current damping total factor $(DT(t_n))$ by subtracting the product of the time elapsed since the immediate prior process iteration $(\Delta t_n)$, the damping factor (DF) and the decay factor (DKF) from the damping total $(DT(t_{n-1}))$ of the immediate prior process iteration, and applying the current damping total factor $(DT(t_n))$ in calculating the compressor output presignal (COPS) provided the compressor speed (CS) is not zero and the current damping total factor $(DT(t_n))$ is greater than zero.

In another aspect, the present invention provides a method of controlling a variable speed compressor and a condenser having a variable speed motor in a refrigeration system. In this aspect, the refrigeration device includes an evaporator having an evaporator air inlet temperature having a median range temperature, a condenser having coils having temperature within the coils with a maximum range, and a condenser fan with a variable speed motor, and a variable speed compressor having a maximum RPM. In this aspect, the method includes selecting a target internal air temperature (SP) for the refrigeration device, measuring the temperature of the air at the evaporator air inlet (P1), and calculating a continuous calibration factor (CCF) by calculating the difference between the target internal air temperature (SP) and the temperature of the air at the evaporator air inlet (P1). In this aspect, the method also includes measuring the temperature within the evaporator coils (P2) and calculating a compressor error $(e(t)_C)$ by subtracting the temperature within the evaporator coils (P2) and an error offset (EO) from the target internal air temperature (SP) and adding the continuous calibration factor (CCF). In this aspect, the method further includes providing a compressor control factor $(u(t)_C)$, and calculating a compressor set factor (CSF) by subtracting the evaporator coil maximum temperature range (MTRP2) and the error offset (EO) from the evaporator median range temperature (MDP1) and multiplying the result by a compressor proportional coefficient $(K_{PC})$ and then adding the maximum compressor RPM (MCRPM). In this aspect, the method further includes providing a damping total factor $(DT(t_n))$, calculating a compressor output presignal (COPS) by subtracting the compressor set factor (CSF) from the control factor $(u(t)_C)$ and adding the damping total $(DT(t_n))$, and calculating a final compressor outlook signal (FCOS) by multiplying the compressor output presignal (COPS) by −1, In this aspect, the method further includes monitoring the speed of the compressor speed (CS), and controlling the compressor speed (CS) and the speed of the condenser fan with the final compressor outlook signal (FCOS).

In a presently preferred embodiment of this aspect of the method of the present invention, the method further includes calculating the compressor control factor $(u(t)_C)$ which is calculated as the sum of the product of a compressor proportional coefficient $(K_{PC})$ and a compressor error $(e(t)_C)$, the product of the compressor integral coefficient $(K_{IC})$ and an integrated compressor error $(\int_0^t e(t)_C dt)$, and the product of the compressor derivative coefficient $(K_{CD})$ and the derivative of the compressor error $(de(t)_C/dt)$.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Terms used in the present specification and claims are defined in the following Symbol Table:

| | |
|---|---|
| CCF | continuous calibration factor |
| COPS | compressor output presignal |
| CSF | compressor set factor |
| $de(t)_C/dt$ | derivative of the compressor error |
| DF | damping factor |
| DKF | decay factor |
| $DT(t_n)$ | damping total factor |
| $DT(t_{n-1})$ | damping total factor from immediate prior process iteration |
| $e(t)_C$ | compressor error |
| $e(t)_E$ | evaporator fan error |
| EFOPS | evaporator fan ouput presignal |
| EFSF | evaporator fan set factor |
| EO | error offset |
| FCOS | final compressor output signal |
| FEFOS | final evaporator fan output signal |
| IDF | integrating speed response damping factor |
| $\int_0^t e(t)_C d\tau$ | Integrated compressor error |
| $K_{CD}$ | compressor derivative coefficient |
| $K_{IC}$ | compressor integral coefficient |
| $K_{PC}$ | compressor proportional coefficient |
| $K_{PE}$ | evaporator fan proportional coefficient |
| MCRPM | maximum compressor RPM |
| MEDCP | maximum evaporator duty cycle percent |
| MTRP1 | maximum temperature range of the air at the evaporator air inlet |
| MTRP2 | maximum temperature range of the air within the evaporator coils |
| MDP1 | median of the temperature range of the air at the evaporator air inlet |
| P1 | temperature of the air at the evaporator air inlet |
| P2 | temperature within the evaporator coils |
| SP | target internal air temperature |
| $u(t)_E$ | evaporator fan proportional factor |
| $u(t)_C$ | compressor control factor |
| $\Delta t_n$ | time elapsed since the immediate prior process iteration |
| CS | compressor speed |

For the various factors defined for the method of the present invention, the corresponding units and range of values are provided as follows:

| Symbol | Units | Range |
|---|---|---|
| SP | ° C. | −50.00° C. to 70.00° C. |
| P1 | ° C. | −50.00° C. to 70.00° C. |
| $e(t)_E$ | ° C. | −50.00° C. to 70.00° C. |
| $K_{PE}$ | DCP/° C. | 0.0 to 1000.0 |

-continued

| Symbol | Units | Range |
|---|---|---|
| $u(t)_E$ | DCP | −40000.0 to 40000.0 |
| EFSF | DCP | −10000.0 to 10000.0 |
| EFOPS | DCP | 0% to 100% |
| FEFOS | DCP | 0% to 100% |
| CCF | ° C. | −50.00° C. to 70.00° C. |
| P2 | ° C. | −50.00° C. to 70.00° C. |
| $u(t)_C$ | RPM | −400000.0 to 400000.0 |
| CSF | RPM | −400000.0 to 400000.0 |
| $K_{PC}$ | RPM/° C. | 0.0 to 10000.0 |
| $DT(t_n)$ | RPM | 0 RPM to 7000 RPM |
| FCOS | RPM | 0 RPM to 7000 RPM |
| $\Delta t_n$ | sec | 0 sec to 120 sec |
| DF | RPM/sec | 0.0 to 100.0 |
| $DT(t_{n-1})$ | RPM | 0 RPM to 7000 RPM |
| DKF | Unitless | 0.0 to 100.0 |
| $e(t)_C$ | ° C. | −50.00° C. to 70.00° C. |
| $K_{IC}$ | RPM/(° C.*sec) | 0.0 to 100.00 |
| $\int_0^t e(t)_C d\tau$ | ° C.*sec | −400000.0 to 400000.0 |
| $K_{CD}$ | (RPM*sec)/° C. | 0 to 1000 |
| $de(t)_C/dt$ | ° C./sec | −400000.0 to 400000.0 |
| EO | ° C. | −50.00° C. to 70.00° C. |
| COPS | RPM | 0 to 7000 RPM |
| MEDCP | DCP | 0% to 100% |
| MTRP1 | ° C. | 50.00° C. to 70.00° C. |
| MTRP2 | ° C. | 50.00° C. to 70.00° C. |
| MDP1 | ° C. | −50.00° C. to 70.00° C. |
| MCRP | RPM | 0 to 7000 RPM |

° C. = degrees Celcius
DCP = duty cycle percent
RPM = revolutions per minute

The method of the present invention is applicable to high performance refrigerators and freezers that are employed in environments in which materials must be stored at closely-controlled temperatures, such as in scientific laboratories, pharmacies and hospitals. In particular, the method is applicable to refrigerators or freezers that employ a variable-speed or -capacity or -frequency or -displacement compressor with either single-speed or variable-speed condenser and evaporator fans. Typically, such devices are controlled to achieve a target internal air temperature of set point (SP).

The method provides a unique PID (proportional-integral-derivative) control process that prevents the compressor from having a large restart speed over-response. The process employs several features. The process employs an Integrating Speed Response Damping Factor (IDF) which increasingly integrates during the time the compressor is off, and then proportionally dampens the output signal. This prevents any compressor large restart speed over-response that can be caused by a large feedback error. Further, a Decay Factor (DKF) is included that determines the rate of decline of the Integrating Speed Response Damping Factor. In addition, in another aspect, the method of the present invention provides an Error Offset factor (EO), which can be applied to any system with a P, PI, PD, or PID control process. The Error Offset (EO) advantageously eliminates the need to derive a system-specific transfer function and the need for tuning the integral and derivative coefficients. In another aspect, the method of the present invention provides a Continuous Calibration Factor (CCF), which can be applied to any system with a P, PI, PD, or PID control process. The Continuous Calibration Factor (CCF) uses evaporator inlet air (return air) temperature (P1) to feedback thermal load changes and/or disturbances. The Continuous Calibration Factor (CCF) eliminates any thermal discontinuities between the refrigeration system evaporator temperature (P2) and the evaporator air inlet (return air) temperature (P1).

In one aspect of the method of the present invention for controlling a refrigeration device, in order to avoid too high an initial compressor speed when restarting the compressor after the compressor has been turned off, the Integrating Speed Response Damping Factor (IDF) is calculated (Eq. 1.0). When the compressor of the refrigeration device turns off, as periodically occurs during operation of a typical refrigeration device, the calculation of the IDF is initiated. The Damping Factor (DF) is an empirical variable that determines the growth of the Damping Total Factor (DT($t_n$)), and the Decay Factor (DKF) is an empirical variable that determines the rate of decline of the Damping Total Factor (DT($t_n$)):

$$DT(t_n) = \int_0^t DF(t) dt$$

$$DT(t_n) = DT(t_{n-1}) + DF \times \alpha t_n \quad \text{(Eq 1.0)}$$

where
DT($t_n$)=Total Output Damping
$\Delta t_n$=Change in time between iterations The IDF continues to integrate until the compressor restarts. The Damping Total Factor (DT($t_n$)) is added to the total sum of the initial output signal from an algorithm that establishes the compressor restart speed. The Damping Total Factor (DT($t_n$)) decreases the initial output value, which causes the compressor to start at a lower speed.

An algorithm (Eq. 1.1) that establishes the main control equation (for a PID controller) for the refrigeration device is:

$$u(t)_C = K_{PC} e(t)_C + K_{IC} \int_0^t e(t)_C dt + K_{DC} \frac{de(t)_C}{dt} \quad \text{(Eq 1.1)}$$

where
$K_{PC}$=Compressor Proportional Coefficient
$K_{IC}$=Compressor Integral Coefficient
$K_{CD}$=Compressor Derivative Coefficient
$e(t)_C$=Compressor Error Compressor Set Factor=$K_{PC}$×(P1 Range Median–Max P2 Temp range–Error Offset)+Max Comp RPM (Eq. 1.2)

P1=Evaporator return air temperature
P2=Evaporator temperature
Error Offset=Empirical variable that modifies the Output Signal Point of Oscillation
Comp RPM=Compressor operating speed in revolutions/minute Final Compressor Output Signal=(−1)*($u(t)_C$+Damping Total Factor($t_n$)−Compressor Set Factor (Eq. 1.3)

The DF reduces in value after the compressor restarts.

Damping Total($t_n$)=Damping Total($t_{n-1}$)−Decay Factor*Damping Factor*$\Delta t_n$>0 (Eq. 1.4)

The Damping Total Factor (DT($t_n$)) is reduced each iteration and added to the output signal. This allows the output signal to increase slowly from its initial start. Once the Damping Total Factor (DT($t_n$)) reaches zero the decay stops and does not affect the output signal. The process waits for the compressor to turn off, and then the IDF integration restarts.

Figure 1:
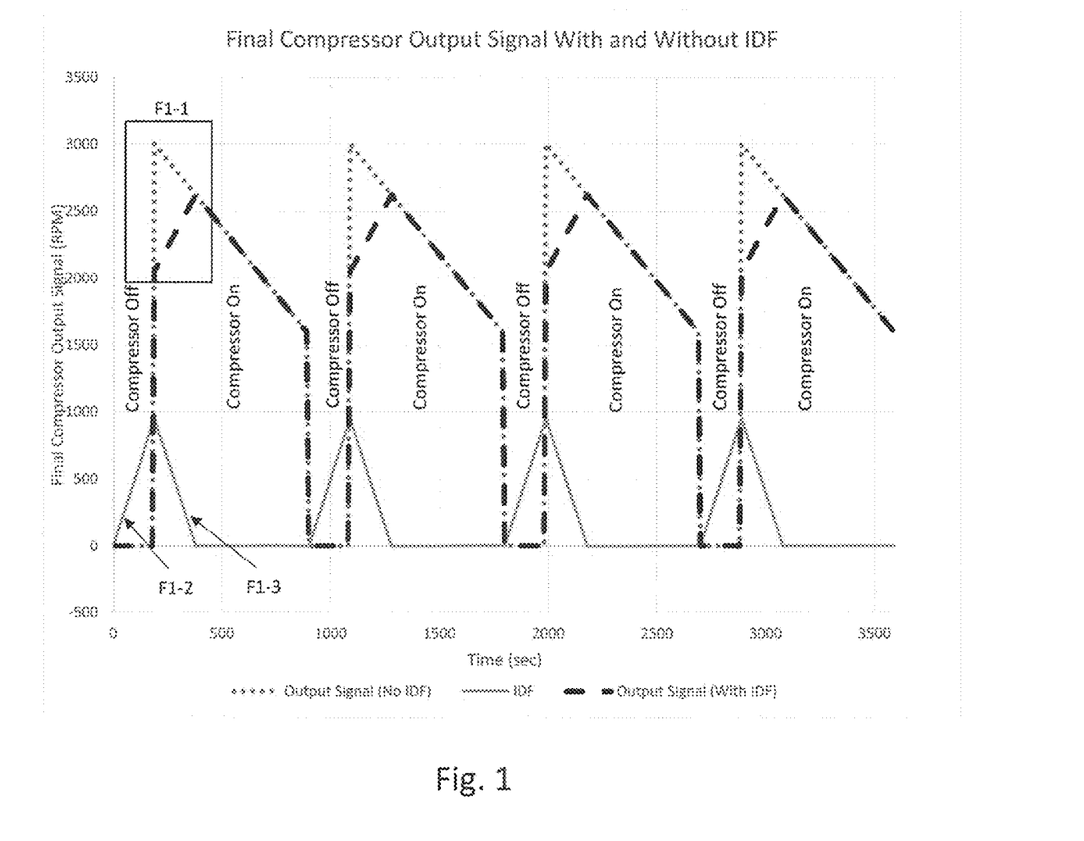
FIG. 1 is a graphical representation of the calculated effect of the Integrated Speed Response Damping Factor (IDF) on the Final Compressor Output Signal (FCOS).

A graphical representation of the calculated effect of the IDF on the Final Compressor Output Signal (FCOS) is provided in FIG. 1. The Final Compressor Output Signal (FCOS) is decreased by IDF (F1-1). This permits the compressor to restart at a lower speed than it would otherwise. The IDF integration (Eq. 1.0) begins when the compressor turns off (F1-2). The IDF starts to decrease (Eq. 1.4) after the compressor turns on (F1-3), and the compressor speed concomitantly increases.

Figure 2:
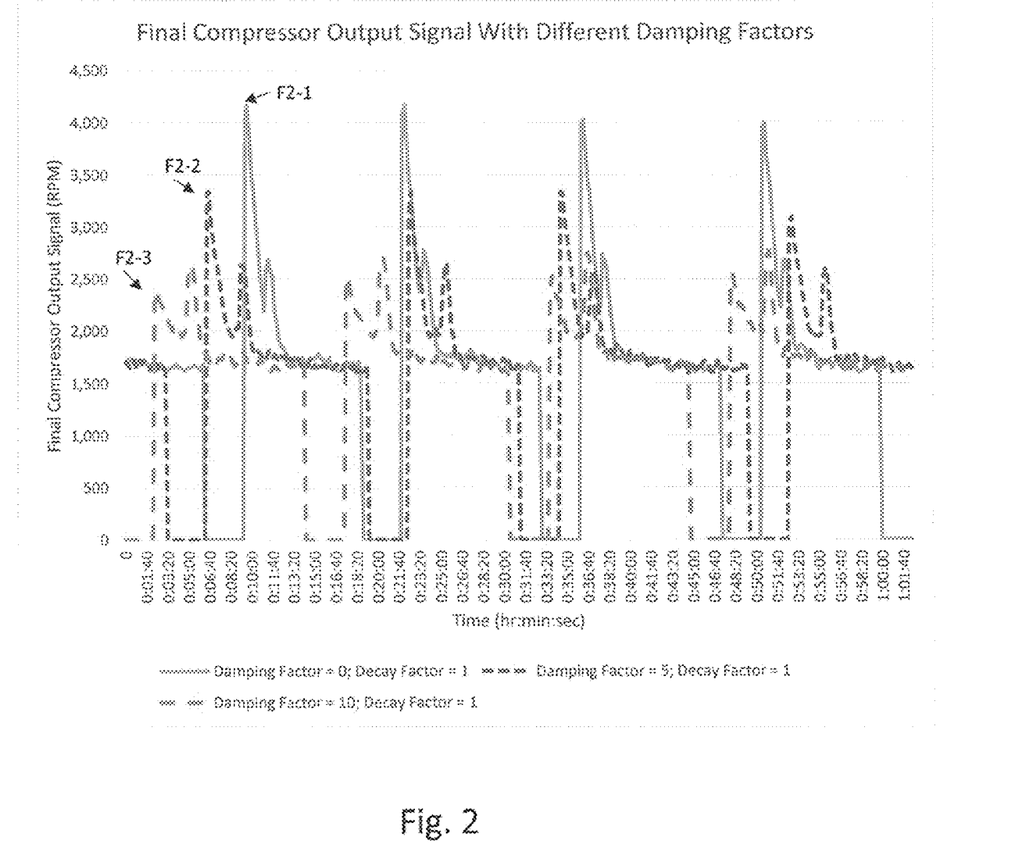
FIG. 2 is a graphical representation of the Final Compressor Output Signal (FCOS) showing the measured effect of various Damping Factor (DF) values with a constant Decay Factor (DKF).

FIG. 2 is a graphical representation of the Final Compressor Output Signal (FCOS) showing the effect of various Damping Factors (DF) with a constant Decay Factor (DKF), as measured in a model system.

The refrigeration device employed for the measurements was a 25 cu. ft. refrigerator with a glass door (REF25, Follett LLC, 801 Church Lane, Easton, Pa. 18040) with a variable speed refrigeration system. The variable speed refrigeration system consisted of a variable speed compressor, variable speed condenser fan, variable speed evaporator fan, condenser, evaporator, capillary tube, and filter drier. The measurements were taken internally within the controller as the system was operating and saved via SD card.

If the Damping Factor (DF) is increased, the initial output signal to the compressor is decreased. If the Damping Factor (DF)=0, the initial output signal allows a large compressor speed over-response (F2-1). If the Damping Factor (DF)=5, the initial output signal decreases (F2-2). If the Damping Factor (DF)=10, the initial output signal is decreased more (F2-3).

Figure 3:
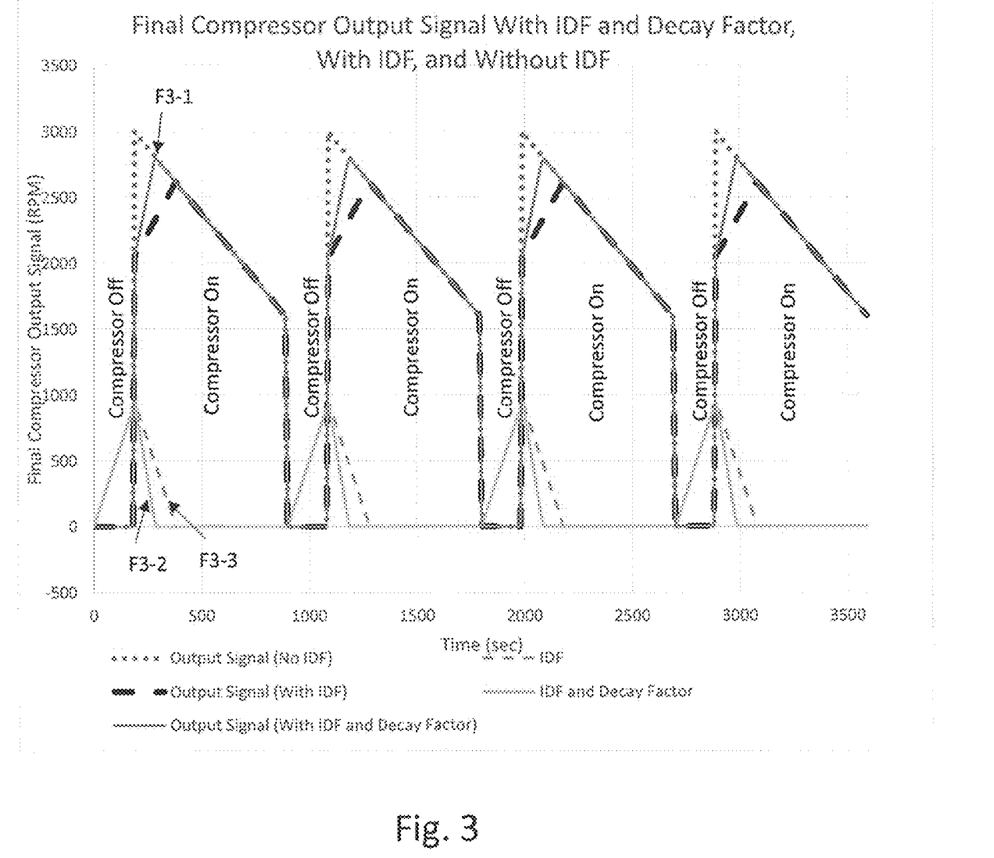
FIG. 3 is a graphical representation of the Final Compressor Output Signal (FCOS) showing the calculated effect of varying the value of the Decay Factor (DKF).

FIG. 3 provides a graphical representation of the calculated effect of the value of the Decay Factor (DKF) on the Final Compressor Output Signal (FCOS) (Eq. 1.4). The value of the Decay Factor (DKF) controls the rate of damping when the compressor restarts (F3-1). If the Decay Factor (DKF) value=1, the rate of Decay Factor (DKF) will equal the rate of integration (F3-3). If the Decay Factor (DKF)=2, the rate of Decay Factor (DKF) will equal half of the rate of integration (F3-2). The Decay Factor (DKF) allows for a larger Damping Factor (DF) in the event of larger initial output over-responses.

Figure 4:
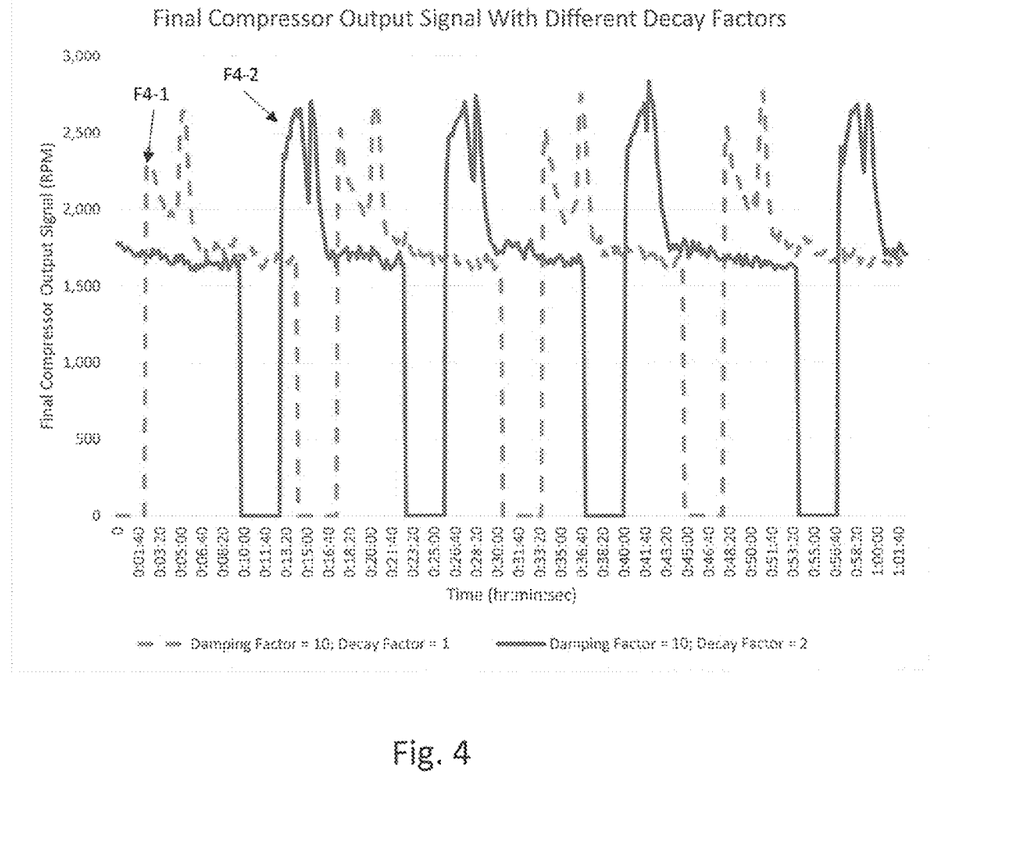
FIG. 4 is a graphical representation of the value of the Final Compressor Output Signal (FCOS) showing the measured effect of varying the value of the Decay Factor (DKF) while maintaining the value of the Damping Factor (DF) at a first constant value.
Figure 5:
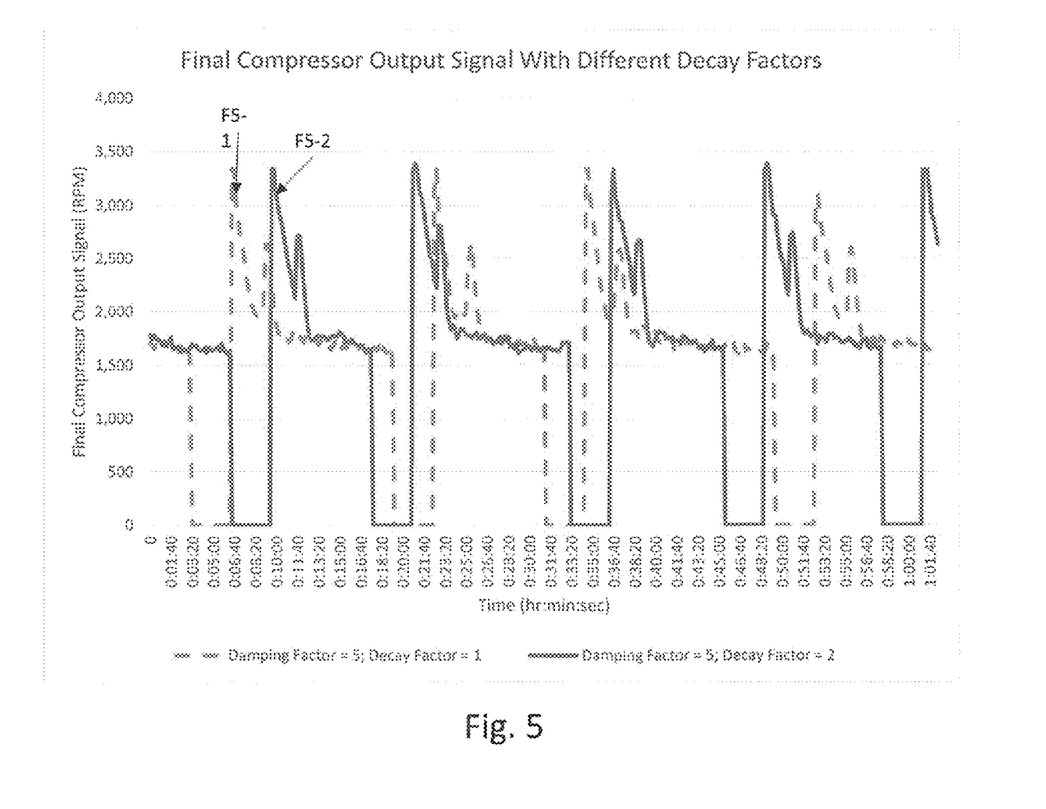
FIG. 5 is a graphical representation of the value of the Final Compressor Output Signal (FCOS) showing the measured effect of varying the value of the Decay Factor (DKF) while maintaining the value of the Damping Factor (DF) at a second constant value.

FIGS. 4 and 5 provide graphical representations of measurements using the above-referenced model system, showing that the restart speed of the compressor is affected by the Damping Factor (DF) not by the value of the Decay Factor (DKF), but the rate of Decay Factor (DKF) of the IDF is changed as the value of the Decay Factor (DKF) is altered. Lines F4-1 and F5-1 have a Decay Factor (DKF) value=1, which decreases the output signal for the same length of time as the integration. Lines F4-2 and F5-2 have a Decay Factor (DKF) value=2, which decreases the output signal for half the time of the integration.

In one aspect, the method of the present invention also provides an Error Offset (EO) to modify the point of oscillation of a PID control signal.

The basic PID equation is a sum or combination of three component equations, which calculate a Proportional, Integral, and Derivative error signal. Each component equation is based on an Error value determined by the feedback loop within a control system.

The standard PID equation is written as:

$$u(t)_C = K_{PC}e(t)_C + K_{IC}\int_0^t e(t)_C d\tau + K_{DC}\frac{de(t)_C}{dt} \quad \text{(Eq 1.1)}$$

$K_{PC}$ = Proportional Coefficient
$K_{IC}$ = Integral Coefficient
$K_{CD}$ = Derivative Coefficient $$e(t)_C = \text{Error} = \text{Setpoint} - \text{Measured Value} \quad \text{(Eq 2.0)}$$

The value of the Error determines the output signal. The output signal then drives the system so the Error is optimally reduced to zero. This zero is the system's Output Signal Point of Oscillation. If the Error value is modified from zero, then the Output Signal Point of Oscillation will be modified.

Error Offset=Empirical variable that modifies Output Signal Point of Oscillation The Error Offset (EO) is included in the Error Function $(e(t)_C)$.

$e(t)_C$=Error=Setpoint−Measured Value P2−Error Offset (Eq. 2.1)

Setpoint=Desired system operating air temperature
P2=Evaporator temperature within coils The tuning of the Variable Speed Restart Control system is only dependent on this unique Error Offset (EO). The Error Offset (EO) allows the Proportional Coefficient ($K_{PC}$) remain fixed, and it eliminates the need to derive a system-specific transfer function. The Integral Coefficient ($K_{IC}$) then only affects the amplitude of the Point of Oscillation. Since the Error value is modified from zero by the Error Offset (EO), the Integral component equation will continue to increase at the Point of Oscillation. This was corrected by adding an Integral limit check to prevent an Integral runaway. The Derivative Coefficient ($K_{DC}$) then only affects the rate of change from the Point of Oscillation. The Error Offset (EO) thus eliminates the need for tuning the Integral and Derivative coefficients.

Figure 6:
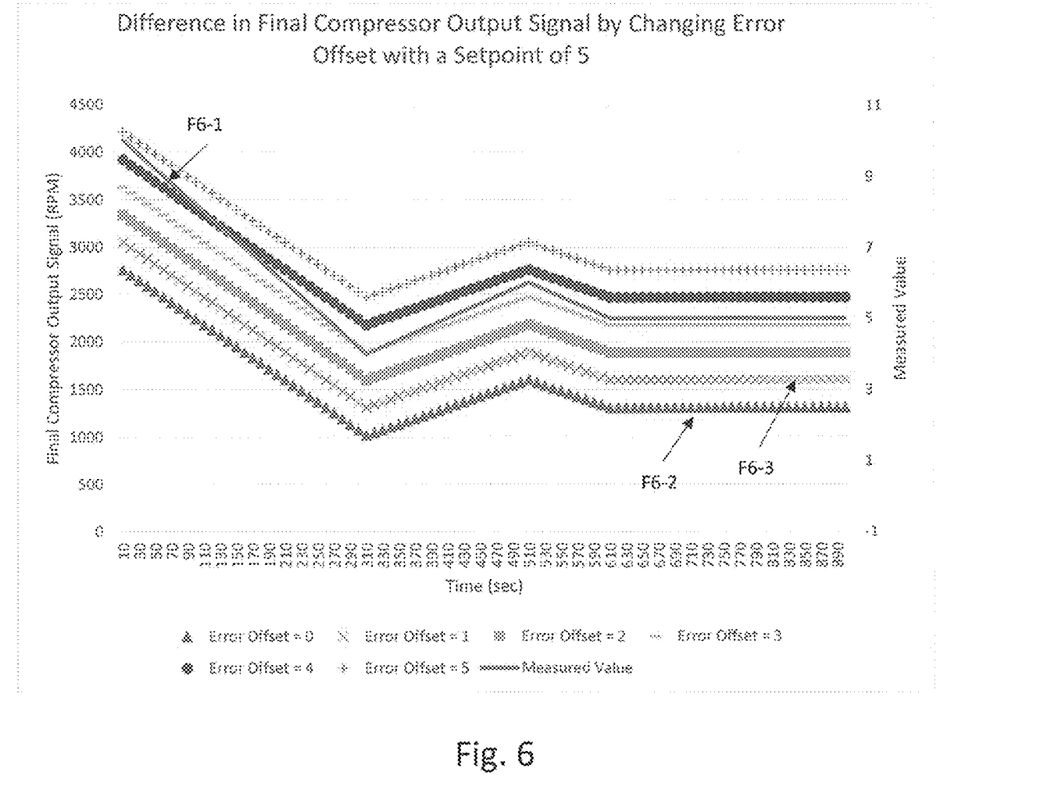
FIG. 6 is a graphical representation showing the calculated effect of varying the value of the Error Offset (EO) on the Output Signal Point of Oscillation.

FIG. 6 provides a graphical representation showing the effect of varying the Error Offset (EO) on the Output Signal Point of Oscillation. As shown by lines F6-2 and F6-3, as the Error Offset (EO) is increased, the Output Signal Point of Oscillation is increased. This shows how the system can be tuned by the Error Offset (EO) to achieve a desired Output Signal. The line F6-1 is shown for reference as the measured values that were applied in this analysis with a Setpoint (SP) of 5 and different Error Offsets (EO).

In another aspect, the present invention provides a method to continuously calibrate a refrigeration system. In this aspect, the method builds on the concept of the Error Offset (EO). While the Error Offset (EO) can easily tune a refrigeration system, it does not compensate for thermal load changes and/or disturbances. These disturbances for a refrigeration system such as a refrigerator or freezer could be a change in external ambient temperature, loss of refrigerant, door opening, etc.

Figure 7:
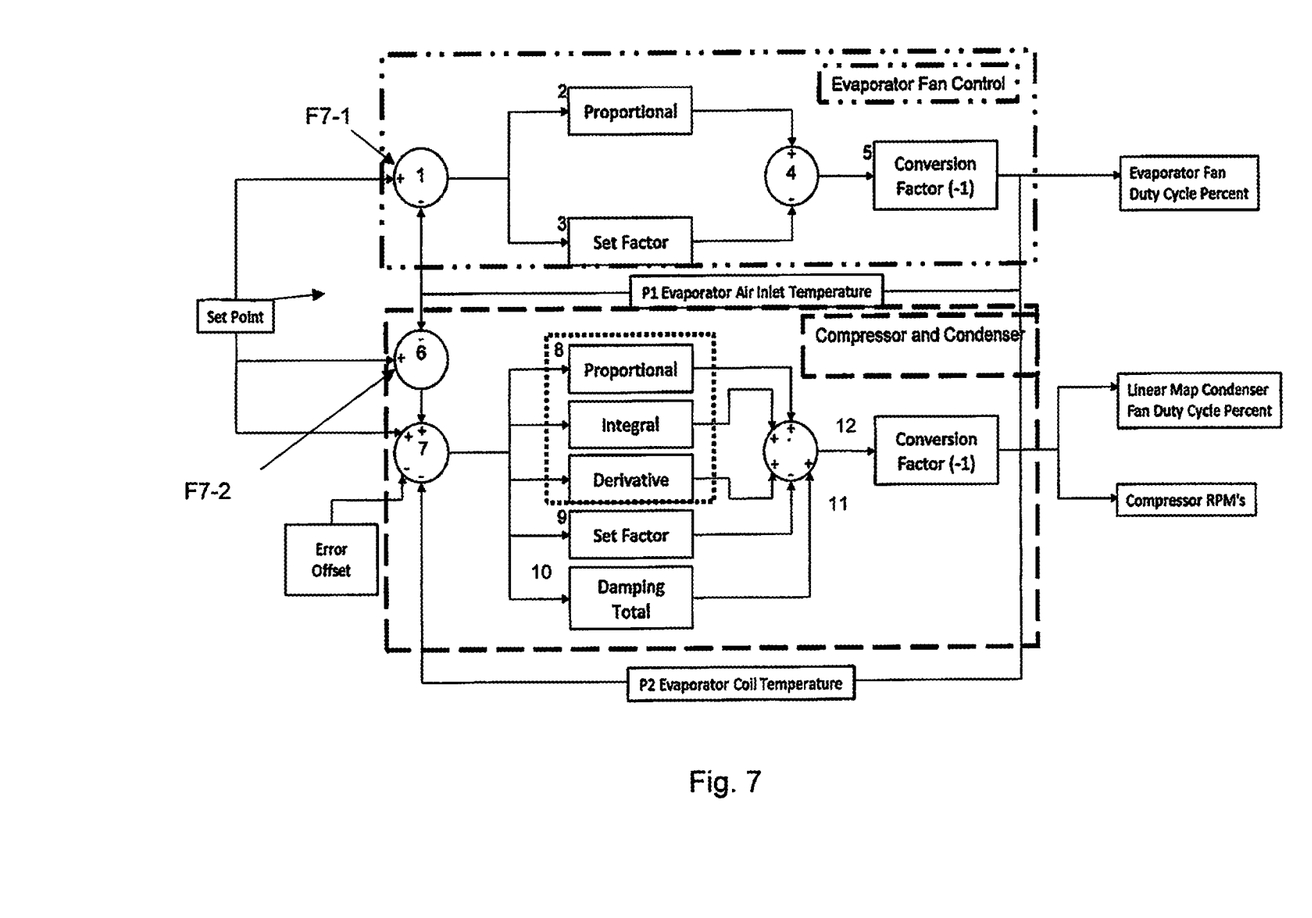
FIG. 7 is a block diagram illustrating a method of controlling a refrigeration device according to the present invention.

FIG. 7 provides a systematic representation of a variable speed compressor restart control system employing the method of the present invention.

The method of the present invention in another aspect provides a Continuous Calibration Factor (CCF) (F7-1) which provides a second feedback loop that is added to the Compressor Error $(e(t)_C)$ (F7-2).

Continuous Calibration Factor=Set Point−Measured Value P1 (Eq 3.0)

The method further provides for calculating a new Compressor Error $(e(t)_C)$ employing the Continuous Calibration Factor (CCF):

$e(t)_C$=Error=Setpoint−Measured Value P2−Error Offset+Continuous Calibration Factor (Eq 3.1)

This allows the system to modulate the Output Signal Point of Oscillation in the event of thermal load changes and/or disturbances. This also eliminates any thermal discontinuities between the refrigeration system evaporator temperature ($P_2$) and the evaporator air inlet (return air) temperature ($P_1$).

The inputs to the process employed by the method of the present invention include:
1. A Set Point (SP), which is a user selected internal air temperature for the refrigeration device.
2. An Evaporator Air Inlet Temperature (P1) which is the temperature measured by a temperature probe located within the evaporator air inlet duct.
3. An Evaporator Coil Temperature (P2) which is the temperature measured by a temperature probe located within the evaporator coil.
4. An Error Offset (EO) which is a user-selected empirical variable that modifies the output signal point of oscillation.

The outputs from the process employed by the method of the present invention include:
1. An Evaporator Fan Duty Cycle Percent which relates to the evaporator fan motor speed control.
2. A Linear Mapped Condenser Fan Duty Cycle Percent which relates to the condenser fan motor speed control.
3. A Compressor RPM which relates to the compressor motor speed control.

In one aspect of the method of the present invention, the speed of the evaporator fan is controlled as follows, and as illustrated schematically in FIG. 7.

First, the evaporator fan error $(e(t)_E)$ is calculated by taking the difference between the target internal air temperature or "Set Point" (SP) and the temperature of the air at the evaporator air inlet (P1) (see reference number 1, FIG. 7)

$e(t)_E$=SP−P1

Next, the evaporator fan proportional factor $(u(t)_E)$ is calculated by multiplying a user selected evaporator fan proportional coefficient $(K_{PE})$ by the evaporator fan error $(e(t)_E)$ (see reference numeral 2, FIG. 7).

$u(t)_E = K_{PE} \times e(t)_E$

Next, the evaporator fan set factor (EFSF) is calculated by subtracting the maximum temperature range of the temperature of the air at the evaporator air inlet (MTRP1) from the median of the temperature range of the air at the evaporator air inlet (MDP1) then multiplying the result by the evaporator fan proportional coefficient ($K_{PE}$) and adding the results to the maximum evaporator fan duty cycle percent (MEDCP) (reference numeral 3, FIG. 7).

EFSF=$K_{PE}$×(MTRP1−MDP1)+MEDCP

Next, the evaporator fan outlet presignal (EFOPS) is calculated by subtracting the evaporator fan set factor (EFSF) from the evaporator fan proportional factor $(u(t)_E)$ (reference numeral 4, FIG. 7).

EFOPS=$u(t)_E$−EFSF

Finally, the evaporator fan outlet presignal (EFOPS) is multiplied by the conversion factor of −1 to produce the final evaporator fan outlet signal (FEFOS) (reference numeral 5, FIG. 7).

FEFOS=−1×EFOPS

In another aspect of the method of the present invention, a secondary feedback loop is provided to connect the evaporator air inlet temperature ($P_1$) to the evaporator coil temperature (P2) to control the compressor and the condenser fan.

In a first step, the difference between the target internal air temperature or set point (SP) and the temperature of the air at the evaporator air inlet ($P_1$) is calculated as the Continuous Calibration Factor (CCF) (see reference numeral 6, FIG. 7).

CCF=SP−$P1$

Next, the Compressor Error $e(t)_C$ is calculated by subtracting the temperature within the evaporator coils (P2) and a user determined error offset (EO) from the Set Point (SP) and adding the Continuous Calibration Factor (CCF) to the result (see reference numeral 7, FIG. 7).

$u(t)_C$=SP−$P2$−EO+CCF

Next, a compressor control factor $u(t)_C$ is calculated by multiplying the user determined compressor proportional coefficient ($K_{PC}$) by the compressor error $u(t)_C$ and adding the result to the product of the user-determined compressor integral coefficient ($K_{IC}$) and the integrated compressor error ($\int_0^t e(t)_C dt$) and subsequently adding the product of the user-determined compressor derivative coefficient ($K_{CD}$) and the derivative of the compressor error ($de(t)_C/dt$) (see reference numeral 8, FIG. 7).

$$u(t)_C = K_{PC} e(t)_C + K_{IC} \int_0^t e(t)_C dt + K_{CD} \frac{de(t)_C}{dt}.$$

Next, a compressor set factor (CSF) is calculated by subtracting the maximum temperature range of the temperature within the evaporator coils (MTRP2) and the error offset (EO) from the median of the temperature range (MDP1) and then multiplying the result by the compressor proportional coefficient ($K_{PC}$) and adding the resulting product to the maximum compressor RPM (MCRPM) (see reference numeral 9, FIG. 7).

CSF=$K_{PC}$×(MDP1−MTRP2−EO)+MCRPM

Next, a Damping Total factor ($DT(t_n)$) is calculated as described below.

Next, a Compressor Output Presignal (COPS) is calculated by subtracting the Compressor Set Factor (CSF) from the Compressor Control Factor $u(t)_C$ and adding the Damping Total factor ($DT(t_n)$) (see reference numeral 11, FIG. 7).

COPS=$u(t)_C$−CSF+$DT(t_n)$

Finally, a final Compressor Output Signal (FCOS) is calculated by multiplying the Compressor Output Presignal (COPS) by minus one (see reference numeral 12, FIG. 7).

FCOS=(−1)×COPS

The final compressor output signal (FCOS) is employed to control the condenser fan duty cycle and the rotational speed of the compressor. Specifically, the final compressor output signal (FCOS) is converted to a serial communication signal which is transmitted to the compressor inverter. The final compressor output signal (FCOS) is also converted from duty cycle percent into a pulse width modulated (PWM) signal and transmitted to the condenser fan.

In another aspect, the method of the present invention provides an integrating speed response damping factor (IDF) for use in controlling operation of a refrigeration device.

Figure 8:
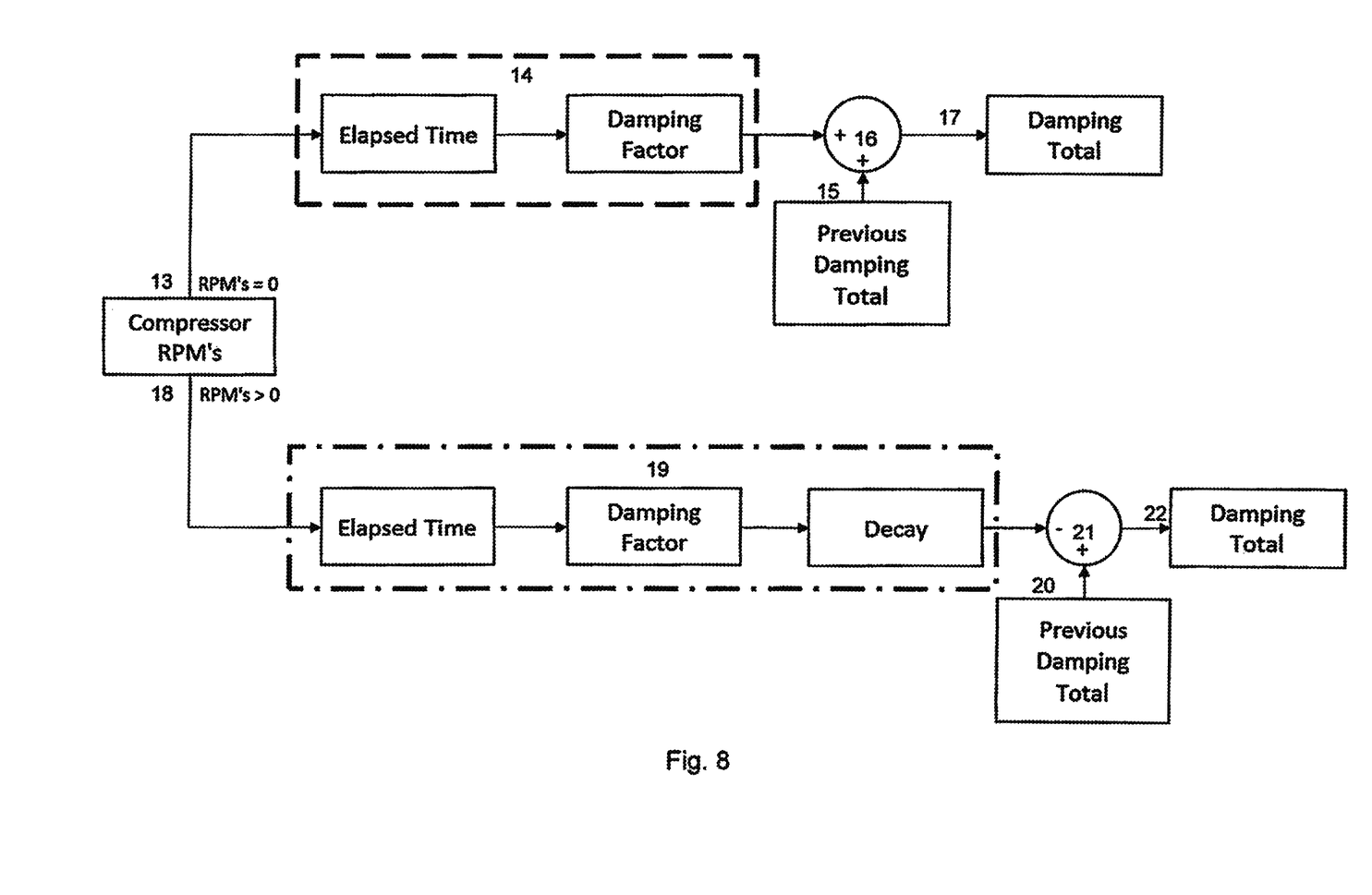
FIG. 8 is a block diagram illustrating a method of calculating a Damping Total ($DT(t_n)$) according to the present invention.

First, if the compressor speed in revolutions per minute (CS) is equal to zero, calculation of the integrating speed response factor is initiated (see reference numeral 13, FIG. 8).

CS=0

First, the time elapsed since the immediate prior process iteration (i.e. when the compressor last stopped) ($\Delta t_n$) is multiplied by a user-selected Damping Factor (DF) (see reference numeral 14, FIG. 8).

DF×$\Delta t_n$

The Damping Total factor from the last process iteration or cycle is provided ($DT(t_{n-1})$) (see reference numeral 15, FIG. 8).

Next, a new Damping Total factor ($DT(t_n)$) is obtained by adding the product of the time elapsed since the immediate prior process iteration ($\Delta t_n$) with the damping factor (DF) to the damping total from the last process iteration ($DT(t_{n-1})$) (see reference numeral 17, FIG. 8).

$DT(t_n)$=$DT(t_{n-1})$+DF×$\Delta t_n$

This is the new Damping Total factor ($DT(t_n)$) that is employed in calculating the compressor output presignal (COPS) as described above.

However, if the compressor speed is greater than zero (see reference numeral 18, FIG. 8), the Damping Total factor ($DT(t_n)$) is reduced.

First, the elapsed time since the immediate prior process iteration ($\Delta t_n$) is multiplied by a user-selected Damping Factor (DF) and a user-selected Decay Factor (DKF) (see reference numeral 19, FIG. 8).

The Damping Total factor from the immediate prior process iteration ($DT(t_{n-1})$) is provided (see reference numeral 20, FIG. 8).

Next, the product of the elapsed time since the immediate prior process iteration ($\Delta t_n$), a user-selected Damping Factor (DF), and a user-selected Decay Factor (DKF) is subtracted from the Damping Total factor from the immediate prior process iteration ($DT(t_{n-1})$) to provide a new Damping Total factor ($DT(t_n)$) (see reference numerals 20, 21, FIG. 8).

This is the new Damping Total factor ($DT(t_n)$) that will be applied to the main control process if the compressor speed (CS) is greater than zero and the damping total ($DT(t_n)$) is greater than zero.

$DT(t_n)$>0; CS>0

Figure 9:
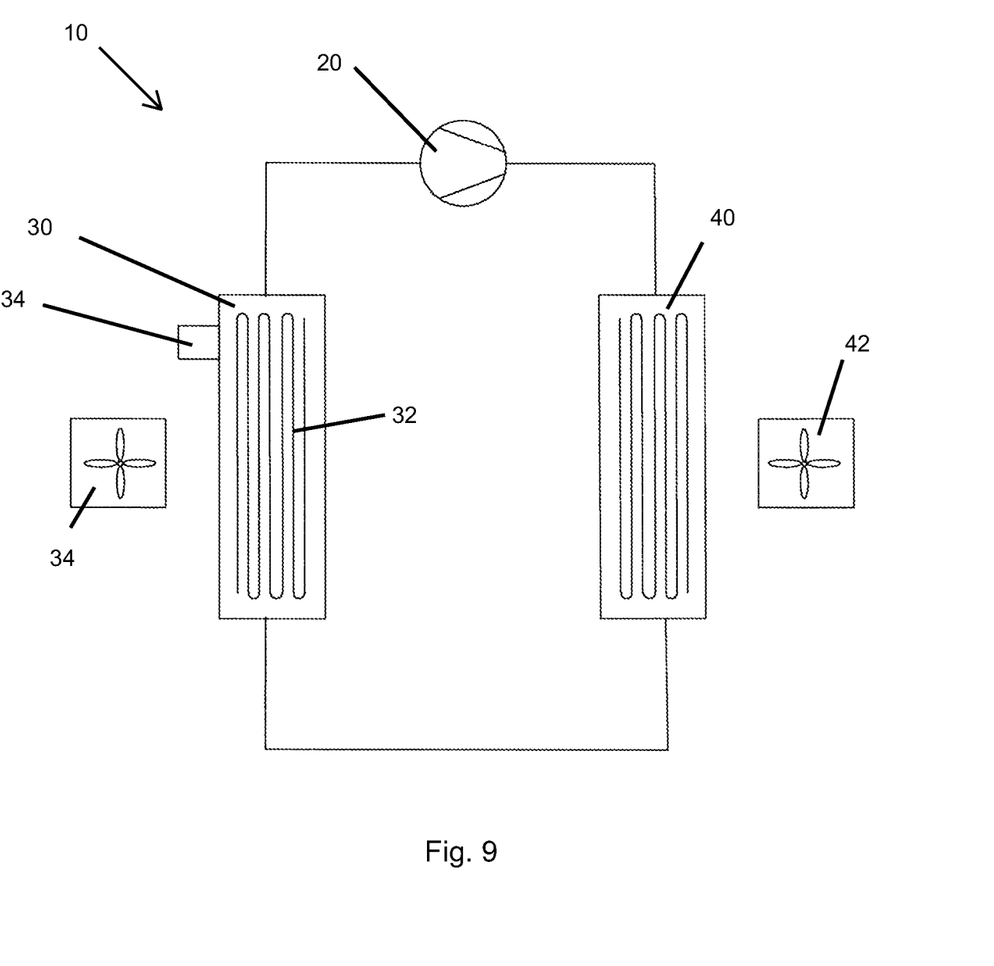
FIG. 9 is a block diagram of a refrigeration device for use with the process of the present invention.

FIG. 9 schematically illustrates a refrigeration device 10 for use with the process of the present invention. The refrigeration device includes a variable speed compressor 20, an evaporator coil 30, an evaporator air inlet 32, an evaporator fan with a variable speed motor 34, a condenser having coils 40, and a condenser fan with a variable speed motor 42.

Various modifications can be made in the details of the various embodiments of the method of the present invention, all within the scope and spirit of the invention and defined by the appended claims

The invention claimed is:

1. A method of controlling a refrigeration device having:
   an evaporator having an evaporator fan having a variable speed motor, a maximum duty cycle range percent (MEDCP), an evaporator coil, and an evaporator air inlet having a maximum temperature range and a median range temperature, a condenser having coils having a temperature within the coils with a maximum temperature range, and a condenser fan with a variable speed motor, and a variable speed compressor having a maximum RPM, the method comprising controlling the variable speed compressor and the condenser fan by:

a) selecting a target internal air temperature (SP) for the refrigeration device;

b) measuring the temperature of the air at the evaporator air inlet (P1);

c) calculating a continuous calibration factor (CCF) by calculating the difference between the target internal air temperature (SP) and the temperature of the air at the evaporator air inlet (P1);

d) measuring the temperature within the evaporator coils (P2);

e) calculating a compressor error $(e(t)_C)$ by subtracting the temperature within the evaporator coils (P2) and an error offset (EO) from the target internal air temperature (SP) and adding the continuous calibration factor (CCF);

f) providing a compressor control factor $(u(t)_C)$;

g) calculating a compressor set factor (CSF) by subtracting the evaporator coil maximum temperature range (MTRP2) and the error offset (EO) from the evaporator median range temperature (MDP1) and multiplying the result by a compressor proportional coefficient $(K_{PC})$ and then adding the maximum compressor RPM (MCRPM);

h) providing a damping total factor $(DT(t_n))$;

i) calculating a compressor output presignal (COPS) by subtracting the compressor set factor (CSF) from the control factor $(u(t)_C)$ and adding the damping total factor $(DT(t_n))$;

j) calculating a final compressor output signal (FCOS) by multiplying the compressor output presignal (COPS) by −1;

k) monitoring the speed of the compressor, and l) controlling the compressor speed and the speed of the condenser fan with the final compressor outlook signal (FCOS);

the method further comprising controlling the evaporator fan by:

a) selecting an evaporator fan proportional coefficient $(K_{PE})$;

b) calculating an evaporator fan proportional factor $(u(t)_E)$ by multiplying the evaporator fan error $(e(t)_E)$ by the evaporator fan proportional coefficient $(K_{PE})$;

c) calculating an evaporator fan set factor (EFSF) by multiplying the evaporator fan proportional coefficient $(K_{PE})$ by the difference between the evaporator air inlet maximum temperature range (MTRP1) and the evaporator air inlet median range temperature (MDP1) and adding the maximum evaporator duty cycle percent (MEDCP);

d) subtracting the evaporator fan set factor (EFSF) from the evaporator fan proportional factor $(u(t)_E)$ to provide an evaporator fan output presignal (EFOPS);

e) multiplying the evaporator fan output presignal (EFOPS) by −1 to provide a final evaporator fan output signal (FEFOS); and f) controlling the speed of the evaporator fan motor with the final evaporator fan output signal (FEFOS).

2. The method of controlling a refrigeration device according to claim 1, the variable speed compressor periodically stopping and starting run cycles; each cycle having a start time and a stop time, the method further comprising:

a) measuring the speed of the compressor motor;

b) in response to the measured speed of the compressor motor of zero, then
  (1) measuring the time elapsed since the stop time of the immediate prior run cycle $(\Delta t_n)$;
  (2) providing a damping factor (DF);
  (3) providing a damping total factor $(DT(t_{n-1}))$ from the immediate prior run cycle;
  (4) calculating a current damping total factor $(DT(t_n))$ by multiplying the time elapsed since the immediate prior run cycle $(\Delta t_n)$ by the damping factor (DF) and adding the damping total factor $(DT(t_{n-1}))$ from the immediate prior run cycle; or c) in response to the measured speed of the compressor motor being not zero, then:
  (1) measuring the time elapsed since the immediate prior run cycle $(\Delta t_n)$;
  (2) providing a damping factor (DF);
  (3) providing a damping total factor $(DT(t_{n-1}))$ from the immediate prior run cycle;
  (4) providing a decay factor (DKF);
  (5) calculating a current damping total factor $(DT(t_n))$ by subtracting the product of the time elapsed since the immediate prior run cycle $(\Delta t_n)$, the damping factor (DF) and the decay factor (DKF) from the damping total $(DT(t_{n-1}))$ of the immediate prior run cycle;
  (6) applying the current damping total factor $(DT(t_n))$ in calculating the compressor output presignal (COPS) provided the compressor speed (CS) is not zero and the current damping total factor $(DT(t_n))$ is greater than zero.

3. The method for controlling a refrigeration device according to claim 1 wherein the compressor control factor $(u(t)_C)$ is calculated as the sum of:

a) the product of a compressor proportional coefficient $(K_{PC})$ and a compressor error $(e(t)_C)$;

b) the product of the compressor integral coefficient $(K_{IC})$ and an integrated compressor error $(\int_0^t e(t)_C dt)$; and c) the product of the compressor derivative coefficient $(K_d)$ and the derivative of the compressor error $(de(t)_C/dt)$.

* * * * *

UNITED STATES PATENT AND TRADEMARK OFFICE
CERTIFICATE OF CORRECTION

PATENT NO. : 11,060,776 B2
APPLICATION NO. : 16/365861
DATED : July 13, 2021
INVENTOR(S) : Seo et al.

Page 1 of 1

It is certified that error appears in the above-identified patent and that said Letters Patent is hereby corrected as shown below:

In the Specification

Column 7, Lines 17-22, Equation 1.0 should read as follows:

$$DT(t_n) = \int_0^t DF(t)dt$$

$$DT(t_n) = DT(t_{n-1}) + DF \times \Delta t_n \qquad (Eq\ 1.0)$$

In the Claims

Column 14, Line 55, change "($K_a$))" to -- ($K_{CD}$) --

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*